US009529407B2

(12) United States Patent
Murakami

(10) Patent No.: US 9,529,407 B2
(45) Date of Patent: Dec. 27, 2016

(54) METHOD FOR CONTROLLING INFORMATION PROCESSING APPARATUS AND INFORMATION PROCESSING APPARATUS

(71) Applicant: FUJITSU LIMITED, Kawasaki-shi (JP)

(72) Inventor: Takeo Murakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 223 days.

(21) Appl. No.: 14/157,569

(22) Filed: Jan. 17, 2014

(65) Prior Publication Data
US 2014/0237274 A1 Aug. 21, 2014

(30) Foreign Application Priority Data

Feb. 21, 2013 (JP) ................................. 2013-032663

(51) Int. Cl.
*G06F 1/26* (2006.01)
*G06F 1/32* (2006.01)

(52) U.S. Cl.
CPC .......... *G06F 1/3243* (2013.01); *G06F 1/3203* (2013.01); *Y02B 60/1239* (2013.01)

(58) Field of Classification Search
CPC ............................ G06F 1/3203; G06F 1/3287
USPC ........................................................ 713/320
See application file for complete search history.

(56) References Cited

U.S. PATENT DOCUMENTS

| 9,146,608 B2 * | 9/2015 | Bieswanger | G06F 1/324 |
| 2006/0129881 A1 * | 6/2006 | Furuichi | G06F 1/206 |
| | | | 714/11 |
| 2009/0094437 A1 * | 4/2009 | Fukuda | G06F 1/3203 |
| | | | 712/28 |
| 2010/0005323 A1 | 1/2010 | Kuroda et al. | |
| 2011/0154348 A1 * | 6/2011 | Elnozahy | G06F 1/324 |
| | | | 718/104 |
| 2011/0219246 A1 * | 9/2011 | Arai | G06F 1/32 |
| | | | 713/320 |
| 2011/0246804 A1 * | 10/2011 | Kaburlasos | G06F 1/3203 |
| | | | 713/340 |
| 2011/0252260 A1 * | 10/2011 | Flachs | G06F 1/3287 |
| | | | 713/324 |

(Continued)

FOREIGN PATENT DOCUMENTS

| JP | 2005-085164 A | 3/2005 |
| JP | 2006-146605 A | 6/2006 |

(Continued)

OTHER PUBLICATIONS

Japanese Office Action in Japanese Patent Application No. 2013-032663 dated Aug. 23, 2016, with partial English translation, 7 pages.

*Primary Examiner* — Thomas Lee
*Assistant Examiner* — Volvick Derose
(74) *Attorney, Agent, or Firm* — Oblon, McClelland, Maier & Neustadt, L.L.P.

(57) ABSTRACT

A method of controlling an apparatus including a processor including a plurality of cores, the method includes, when a number of the cores to be activated is M, determining whether or not a first power consumed by the M activated core is within a range of a second power to be consumed when the number of the cores to be activated is M+N, and when the first power is out of the range of the second power, prohibiting to increase the number of the cores to be activated from M to M+N.

14 Claims, 17 Drawing Sheets

(56) References Cited

U.S. PATENT DOCUMENTS

| | | | |
|---|---|---|---|
| 2012/0117403 A1* | 5/2012 | Bieswanger | G06F 1/3206 713/322 |
| 2012/0198207 A1* | 8/2012 | George | G06F 1/3206 712/36 |
| 2012/0216054 A1* | 8/2012 | Cho | G06F 1/3287 713/300 |
| 2013/0097453 A1* | 4/2013 | Choi | G06F 1/324 713/501 |
| 2013/0196709 A1* | 8/2013 | Nho | G06F 1/324 455/550.1 |
| 2013/0238912 A1* | 9/2013 | Priel | G06F 1/324 713/300 |
| 2014/0032941 A1* | 1/2014 | Kajigaya | G06F 1/26 713/300 |
| 2014/0317389 A1* | 10/2014 | Wenisch | G06F 1/20 712/229 |
| 2015/0192979 A1* | 7/2015 | Ghose | G06F 1/206 713/320 |
| 2015/0277988 A1* | 10/2015 | Watanabe | G06F 1/3203 718/104 |

FOREIGN PATENT DOCUMENTS

| | | |
|---|---|---|
| JP | 2009-093383 A | 4/2009 |
| WO | 2007/141849 A1 | 12/2007 |

* cited by examiner

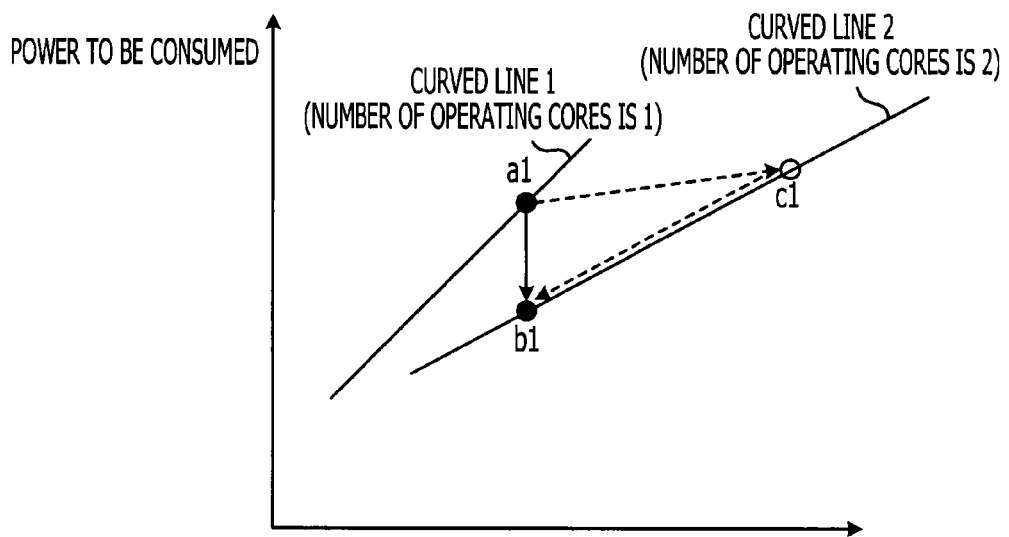
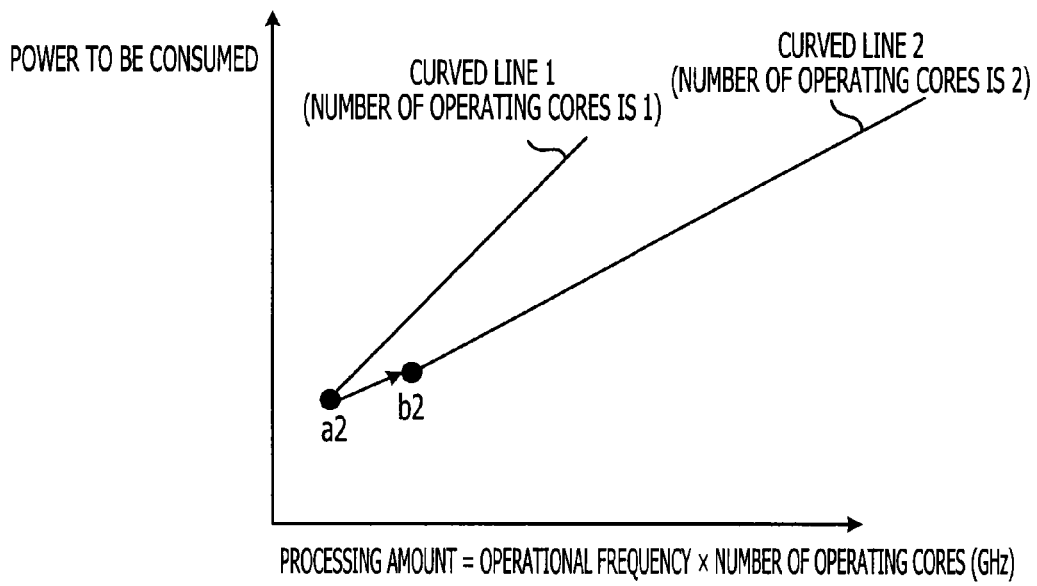

| PROCESS ID | PROGRAM NAME | TYPE | STATE |
|---|---|---|---|
| 2 | com.android browser | FOREGROUND | CURRENTLY EXECUTED |
| 283 | system_server | BACKGROUND | CURRENTLY EXECUTED |
| ... | ... | ... | ... |

| THREAD ID (Sid) | 10 |
|---|---|
| EXECUTION STATE (State) | CURRENTLY EXECUTED (R) |
| PARENT PROCESS ID (Ppid) | 2 |
| ACCUMULATED EXECUTION TIME (ms) | 3195 |

| | |
|---|---|
| Online (NUMBER OF ONLINE CPU CORE) | 0 |
| Offline (NUMBER OF OFFLINE CPU CORE) | 1 |
| run_queue_avg (AVERAGE OF LENGTHS OF RUN QUEUES FOR THREADS) | 0.78 |
| CPU UTILIZATION (%) | 65 |
| OPERATIONAL FREQUENCY (MHz) | 800 |

| NUMBER OF OPERATING CORES | FIRST FREQUENCY THRESHOLD (MHz) | SECOND FREQUENCY THRESHOLD (MHz) | FIRST RUN QUEUE LENGTH THRESHOLD | SECOND RUN QUEUE LENGTH THRESHOLD |
|---|---|---|---|---|
| 1 | 700 | 1000 | 2.0 | 1.5 |
| 2 | 1200 | 1500 | 3.0 | 2.4 |
| 3 | 2000 | 2500 | 4.0 | 3.3 |
| 4 | – | – | – | – |

| DURATION THRESHOLD (ms) | LOWER LIMIT FOR THREAD LOAD MEASUREMENT (MHz) | THIRD RUN QUEUE LENGTH THRESHOLD | PARALLELISM LEVEL THRESHOLD |
|---|---|---|---|
| 300 | 800 | – | 2 |
| 300 | 1300 | 1.2 | 3 |
| 300 | 2300 | 2.2 | 4 |
| 300 | – | 3.2 | – |

| | |
|---|---|
| Online (NUMBER OF ONLINE CPU CORE) | 0,1 |
| Offline (NUMBER OF OFFLINE CPU CORE) | 2,3 |
| run_queue_avg (AVERAGE OF LENGTHS OF RUN QUEUES FOR THREADS) | 1.78 |
| CPU UTILIZATION (%) | 65 |
| OPERATIONAL FREQUENCY (MHz) | 800 |

METHOD FOR CONTROLLING INFORMATION PROCESSING APPARATUS AND INFORMATION PROCESSING APPARATUS

CROSS-REFERENCE TO RELATED APPLICATION

This application is based upon and claims the benefit of priority of the prior Japanese Patent Application No. 2013-032663, filed on Feb. 21, 2013, the entire contents of which are incorporated herein by reference.

FIELD

The embodiments discussed herein are related to a method for controlling an information processing apparatus provided with a multi-core CPU and an information processing apparatus.

BACKGROUND

With the improvement of performance of mobile information terminals and the increase in the number of functions of each mobile information terminal, power to be consumed by the mobile information terminals tends to be increased. There are, however, limits to power to be supplied by batteries installed in the mobile information terminals. In recent years, mobile information terminals have a multi-core CPU including multiple cores, dynamically increase and reduce (optimize) the number of operating cores while monitoring a CPU load, and thereby reduce power to be consumed by the overall CPU, while their user operability is ensured.

International Publication Pamphlet No. WO2007-141849 and Japanese Laid-open Patent Publication Nos. 2006-146605 and 2009-093383 are examples of related art.

SUMMARY

According to an aspect of the invention, a method of controlling an apparatus including a processor including a plurality of cores, the method includes, when a number of the cores to be activated is M, determining whether or not a first power consumed by the M activated core is within a range of a second power to be consumed when the number of the cores to be activated is M+N, and when the first power is out of the range of the second power, prohibiting to increase the number of the cores to be activated from M to M+N.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 2A and 2B are schematic diagrams illustrating changes in power to be consumed when the number of operating cores of the CPU according to the first embodiment is increased;

FIG. 5 is an outline diagram illustrating application and service execution information according to the first embodiment;

FIG. 8 is an outline diagram illustrating process execution information according to the first embodiment;

FIG. 9 is an outline diagram illustrating system state information according to the first embodiment;

FIG. 16 is an outline diagram illustrating CPU core control parameter information according to the second embodiment; and FIG. 17 is an outline diagram illustrating system state information according to the second embodiment.

DESCRIPTION OF EMBODIMENTS

A conventional mobile information terminal controls the number of operating cores of a multi-core CPU on the basis of a CPU load caused by an overall system and suppresses power to be consumed by the mobile information terminal.

It is, however, expected that performance of information processing devices will be improved and the number of functions will be increased, and there is a demand to further reduce power to be consumed in the future.

Relationships between the numbers of operating cores of a multi-core CPU (hereinafter referred to as CPU, and sometimes as a processor) and power to be consumed by the CPU are described with reference to FIGS. 1 to 2B. A so-called dual-core CPU that has two cores is used as the multi-core CPU.

Figure 1:
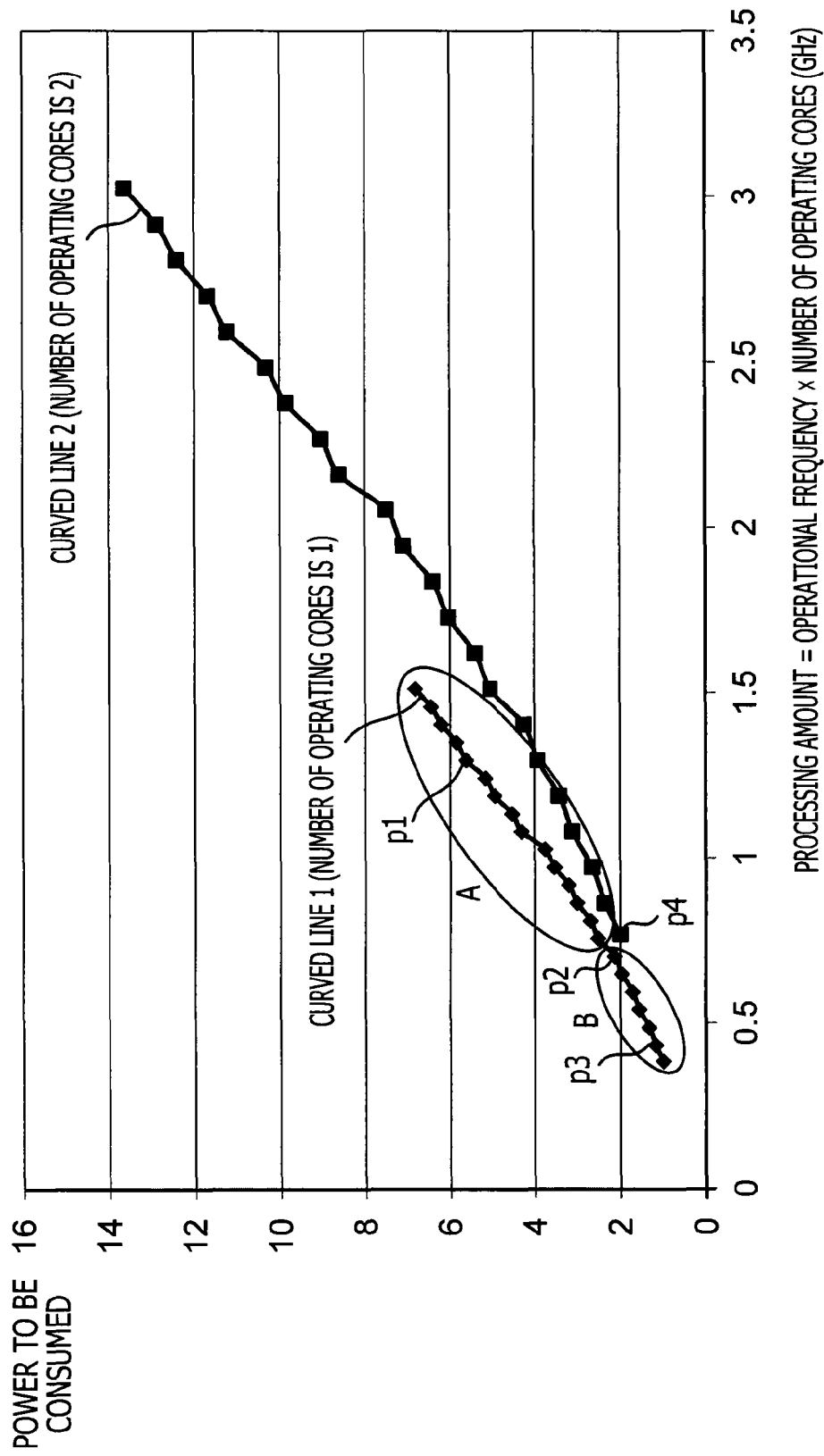
FIG. 1 is a graph illustrating relationships between processing amounts (workloads) of a CPU according to the first embodiment and power to be consumed by the CPU.

FIG. 1 is a graph illustrating relationships between processing amounts (workloads) of the CPU and power to be consumed by the CPU. In the graph, the abscissa indicates a processing amount, and the ordinate indicates power to be consumed. The processing amount is a value (GHz) obtained by multiplying an operational frequency of the CPU by the number of operating cores of the CPU.

A curved line 1 indicates the relationship when the number of operating cores of the CPU is 1, while a curved line 2 indicates the relationship when the number of operating cores of the CPU is 2. Each of plots of the curved lines 1 and 2 is an intersection of a processing amount (=(an operational frequency of the CPU)×(the number of operating cores of the CPU)) and power to be consumed when the operational frequency of the CPU is provided.

An operational frequency of an n-th plot of the curved line 1 from the left side corresponds to an operational frequency of an n-th plot of the curved line 2 from the left side. For example, when an operational frequency of the first plot of the curved line 1 from the left side is 0.3 GHz, an operational frequency of the first plot of the curved line 2 from the left side is also 0.3 GHz. Since the abscissa indicates the processing amount (=(the operational frequency)×(the number of operating cores)), however, a processing amount of the first plot of the curved line 2 from the left side is 2 times as large as the operational frequency of the first plot of the curved line 2 from the left side or is 0.6 GHz (=0.3 GHz×2 (cores)).

As illustrated in FIG. 1, it is apparent that when the operational frequency of the CPU is high (or in a range indicated by a circle A), power to be consumed by the CPU may be reduced by increasing the number of operating cores to 2 while an equivalent processing amount is ensured. It is also apparent that when the operational frequency of the CPU is low (or in a range indicated by a circle B), power to be consumed by the CPU is not reduced and is increased by increasing the number of operating cores to 2.

FIGS. 2A and 2B are schematic diagrams illustrating changes in power to be consumed when the number of operating cores of the CPU according to the first embodiment is increased. FIG. 2A illustrates a state in which the operational frequency of the CPU is high (or corresponds to the range indicated by the circle A illustrated in FIG. 1), while FIG. 2B illustrates a state in which the operational frequency of the CPU is low (or corresponds to the range indicated by the circle B illustrated in FIG. 1).

As illustrated in FIG. 2A, when the operational frequency of the CPU is high and the number of operating cores of the CPU is increased to 2, the processing power of the CPU is increased by 2 and the operational frequency of the CPU is reduced to a level corresponding to a load of the CPU with the increased processing power after the increase in the number of operating cores. Thus, when the operational frequency of the CPU is high, the operational frequency of the CPU may be reduced by increasing the number of operating cores, and as a result, power to be consumed by the CPU may be reduced.

Specifically, when the operational frequency of the CPU is high and the number of operating cores of the CPU is increased, an operational point a1 of the curved line 1 transitions to an operational point c1 of the curved line 2. The operational frequency of the CPU is reduced after the transition to the operational point c1, and the operational point c1 transitions to an operational point b1 of the curved line 2 (power to be consumed at the operational point b1 is lower than power to be consumed at the operational point a1).

As illustrated in FIG. 2B, however, when the operational frequency of the CPU is high and the number of operating cores of the CPU is increased, the processing power of the CPU is increased by 2, but the operational frequency of the CPU is not sufficiently reduced due to the lowest value of the operational frequency of the CPU. Thus, when the operational frequency of the CPU is low and the number of operating cores is increased, the operational frequency of the CPU may not be reduced, and as a result, power to be consumed by the CPU may not be sufficiently reduced.

Specifically, when the operational frequency of the CPU is low and the number of operating cores of the CPU is increased, an operational point a2 of the curved line 1 transitions to an operational point b2 of the curved line 2. The operational frequency of the CPU, however, may not be reduced after the transition to the operational point b2, and no further transition is made. Thus, even when the number of operating cores is increased, power to be consumed by the CPU may not be reduced. Actually, power to be consumed by the CPU is increased by increasing the number of operating cores.

Based on the aforementioned facts, when the operational frequency of the CPU is low, an increase in power to be consumed by the CPU is suppressed by prohibiting an increase in the number of operating cores in the following embodiments. The time "when the operational frequency of the CPU is low" corresponds the time when an operational point, which is among multiple operational points (plots of the curved line 2) after an increase in the number of operating cores of the CPU and at which power to be consumed is lower than that at an operational point (plot of the curved line 1) before the increase in the number of operating cores of the CPU, does not exist.

For example, as illustrated in FIG. 1, it is apparent that if the operational point before the increase in the number of operating cores of the CPU is "p1", an operational point, which is among the multiple operational points of the curved line 2 and at which power to be consumed is lower than that at the operational point "p1", exists. In addition, it is apparent that if the operational point before the increase in the number of operating cores of the CPU is "p2", an operational point "p4", which is among the multiple operational points of the curved line 2 and at which power to be consumed is lower than that at the operational point "p2", exists. Thus, if the operational point before the increase in the number of operating cores of the CPU is "p1" or "p2", power to be consumed by the CPU is reduced by increasing the number of operating cores.

It is apparent that if the operational point before the increase in the number of operating cores of the CPU is "p3", an operational point, which is among the multiple plots of the curved line 2 and at which power to be consumed is lower than that at the operational point "p3", does not exist. Thus, if the operational point before the increase in the number of operating cores of the CPU is "p3" and the number of operating cores is increased, power to be consumed by the CPU is not reduced. Thus, when the operational frequency of the CPU is lower than an operational frequency of the operational point "p3", the number of operating cores of the CPU is not increased.

First Embodiment

A mobile information terminal 100 according to the first embodiment is described with reference to FIGS. 3 to 13. In the first embodiment, a smart phone, a tablet personal computer (PC), or the like may be used as the mobile information terminal 100. ANDROID (registered trademark) may be used as an operating system (OS) installed in the mobile information terminal 100. ANDROID includes an OS kernel, an application framework, and a library. A control program according to the first embodiment is included in the application framework or the library. The embodiments, however, are not limited to this. Another OS may be used instead of ANDROID. The control program according to the first embodiment may be included in a structure other than the application framework and the library.

Figure 3:
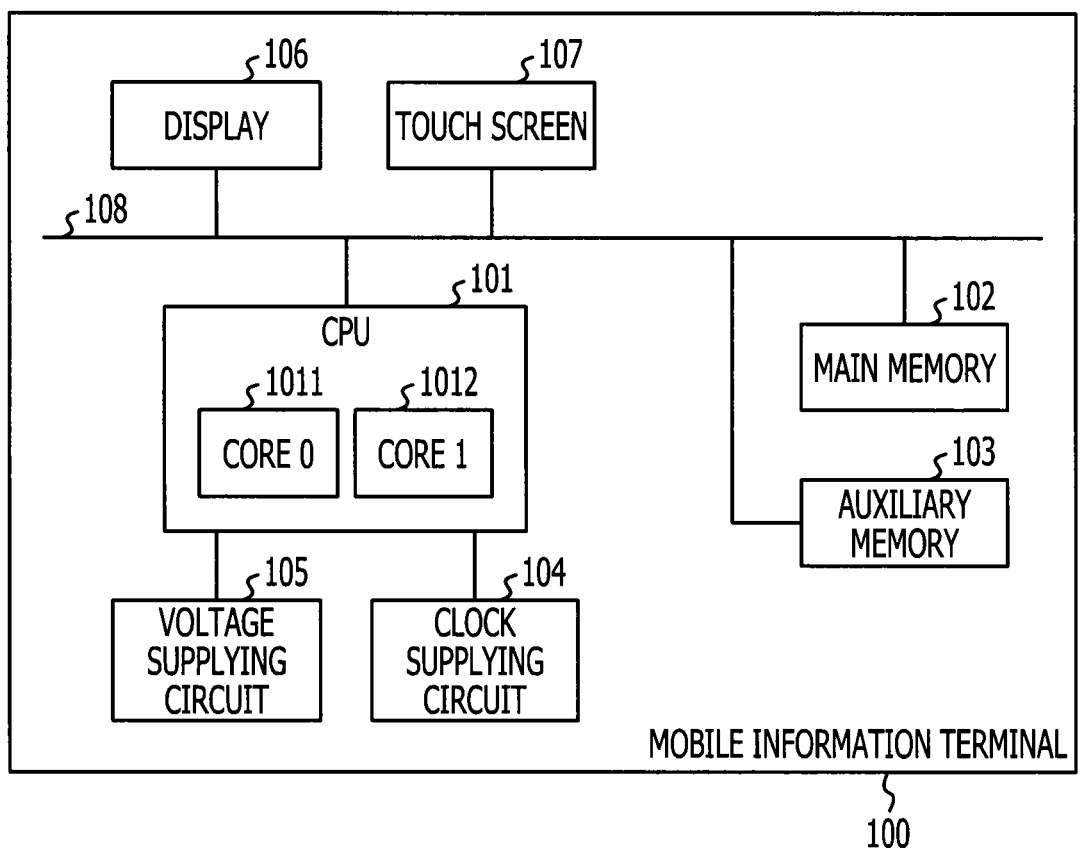
FIG. 3 is an outline diagram illustrating a hardware configuration of a mobile information terminal according to the first embodiment.

FIG. 3 is an outline diagram illustrating a hardware configuration of the mobile information terminal 100 according to the first embodiment.

As illustrated in FIG. 3, the mobile information terminal 100 according to the first embodiment includes a central processing unit (CPU) 101, a main memory 102, an auxiliary memory 103, a clock supplying circuit 104, a voltage supplying circuit 105, a display 106, and a touch screen 107 as hardware modules. The hardware modules are connected to each other by a bus 108.

The CPU 101 is a type of multi-core processor and is operated by a clock signal supplied by the clock supplying circuit 104 and a voltage supplied by the voltage supplying circuit 105 and controls the other hardware modules of the mobile information terminal 100. The CPU 101 is a so-called dual-core CPU and includes a core (core 0) 1011 and a core (core 1) 1012. The CPU 101 reads various programs stored in the auxiliary memory 103 and loads the programs into the main memory 102. The CPU 101 executes the various programs loaded into the main memory 102 and thereby achieves various functions. Details of the various functions are described later. In the first embodiment, the dual-core CPU is used as the CPU 101. The CPU 101, however, may be another multi-core CPU such as a quad-core CPU and may include an arbitrary number of cores.

The main memory 102 stores the various programs to be executed by the CPU 101. The main memory 102 is used as a work area of the CPU 101 and stores various types of data to be used for processing to be executed by the CPU 101. As the main memory 102, a random access memory (RAM) or the like may be used.

The auxiliary memory 103 stores the various programs to be used to operate the mobile information terminal 100. Examples of the various programs are the operating system (OS) and application programs to be executed by the mobile information terminal 100. The auxiliary memory 103 stores, as the application programs, an "application" that causes a content (execution result) to be displayed on the display 106 and enables a user to operate a screen, a "service" that does not cause a content to be displayed on the display 106 and is executed in the background for the execution of the application, and the like. When a plurality of applications are activated, however, the auxiliary memory 103 stores either an application (foreground application) that causes a content to be displayed in the foreground on the display 106 and enables the user to operate the screen in practice or an application (background application) that does not cause a content to be displayed in the foreground on the display 106 and does not enable the user to operate the screen in practice. The control program according to the first embodiment is stored in the auxiliary memory 103. As the auxiliary memory 103, a hard disk or a nonvolatile memory such as a flash memory may be used.

The display 106 is controlled by the CPU 101 and displays image information to the user. The touch screen 107 is attached to the display 106 and used to enter information of a position touched by a finger of the user or an edge of a pen.

Figure 4:
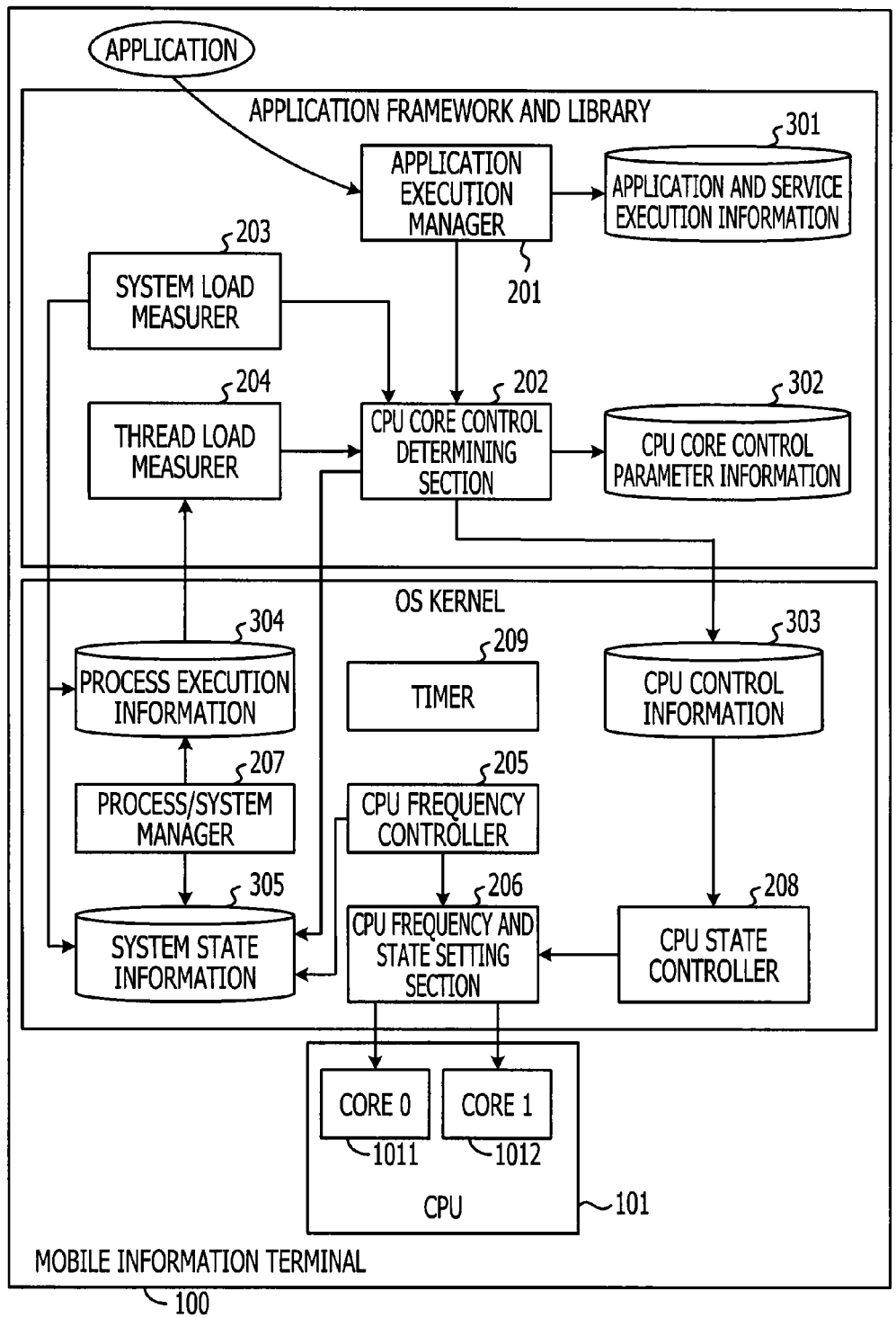
FIG. 4 is an outline diagram illustrating functional blocks of the mobile information terminal according to the first embodiment.

FIG. 4 is an outline diagram illustrating functional blocks of the mobile information terminal 100 according to the first embodiment.

As illustrated in FIG. 4, the mobile information terminal 100 according to the first embodiment includes circuitry (programmed or dedicated hardware) that implement an application execution manager 201, a CPU core control determining section 202, a system load measurer 203, a thread load measurer 204, a CPU frequency controller 205, a CPU frequency and state setting section 206, a process and system manager 207, a CPU state controller 208, a timer 209, application and service execution information 301, CPU core control parameter information 302, CPU control information 303, process execution information 304, and system state information 305.

The application execution manager 201, the CPU core control determining section 202, the system load measurer 203, the thread load measurer 204, the CPU frequency controller 205, the CPU frequency and state setting section 206, the process and system manager 207, the CPU state controller 208, the timer 209, the application and service execution information 301, the CPU core control parameter information 302, the CPU control information 303, the process execution information 304, and the system state information 305 are each achieved by causing the CPU 101 to execute the OS kernel of ANDROID or the application framework and the library.

The application and service execution information 301, the CPU core control parameter information 302, the CPU control information 303, the process execution information 304, and the system state information 305 are built in the auxiliary memory 103.

The application execution manager 201 manages the execution and termination of the programs such as the application and the service. Specifically, when a usage environment for an application program such as the application or the service or the state of a process of the application or service is changed, the application execution manager 201 updates the "type" or "state" of the application and service execution information 301 (described later). As usage environments, the foreground and the background are defined. For example, when the application program starts to be executed in the foreground or is activated or restarted in the foreground, the application execution manager 201 accesses the application and service execution information 301 and updates the "type" to the "foreground" and the "state" to "currently executed".

The CPU core control determining section 202 periodically monitors an operational state of a system and determines whether or not the number of operating cores of the CPU 101 is increased or reduced. Specifically, the CPU core control determining section 202 references the system state information 305, the CPU core control parameter information 302, and the like and changes a detail set in "cpu1/online" of the CPU control information 303 on the basis of "run-queue-avg" (the average of the lengths of run queues for threads), the number (parallelism level) of threads executed by the CPU 101, the number of operating cores of the CPU 101, the operational frequency of the CPU 101, and various control parameters.

The thread load measurer 204 references the process execution information 304 and calculates, on the basis of accumulated execution times, a parallelism level of threads executed by the CPU 101.

The system load measurer 203 monitors the operational state of the overall system, references details stored in the "run-queue-avg" and "CPU utilization" of the system state information 305, and uses the referenced details to determine control of the cores.

The CPU frequency controller 205 periodically references the system state information 305 and instructs, on the basis of the "CPU utilization" of the system state information 305, the CPU frequency and state setting section 206 to change the operational frequency of an operating core of the CPU 101.

The CPU frequency and state setting section 206 turns on or off the core (core 1) 1012 of the CPU 101 on the basis of an ON or OFF instruction provided by the CPU state controller 208. In addition, the CPU frequency and state setting section 206 controls the operational frequency of an operating core of the CPU 101 on the basis of the instruction provided by the CPU frequency controller 205 and indicating the change in the operational frequency.

The process and system manager 207 monitors an execution state of a process executed by the CPU 101 and updates an "execution state" and "accumulated execution time" of the process execution information 304. In addition, the process and system manager 207 monitors the operational state of the overall system and updates "Online", "Offline" "run-queue-avg", "CPU utilization", and "operational frequency" of the system state information 305.

The CPU state controller 208 periodically monitors the CPU control information 303 and notifies the CPU frequency and state setting section 206 of an ON or OFF instruction on the basis of the "cpu1/online" of the CPU control information 303. For example, when the core (core 1) 1012 is in an ON state and the "cpu1/online" is changed from "1" to "0", the CPU state controller 208 notifies the CPU frequency and state setting section 206 of the OFF instruction so as to instruct the CPU frequency and state setting section 206 to turn off the core (core 1) 1012. On the other hand, when the core (core 1) 1012 is in an OFF state and the "cpu1/online" is changed from "0" to "1", the CPU state controller 208 notifies the CPU frequency and state setting section 206 of the ON instruction so as to instruct the CPU frequency and state setting section 206 to turn on the core (core 1) 1012.

The timer 209 notifies the application execution manager 201, the CPU core control determining section 202, the system load measurer 203, the thread load measurer 204, the CPU frequency controller 205, the CPU frequency and state setting section 206, the process and system manager 207, and the CPU state controller 208 of the current time acquired from a real time clock circuit (not illustrated), for example.

FIG. 5 is an outline diagram illustrating the application and service execution information 301 according to the first embodiment.

As illustrated in FIG. 5, the application and service execution information 301 stores a "process ID", a "program name", a "type", and a "state" for each of the application programs. The application and service execution information 301 stores information of processes of all the application programs to be executed by the CPU 101. Thus, the application and service execution information 301 stores information of processes of applications (foreground applications and background applications) and services, for example. The "foreground" and the "background" are defined as "types". As "states", "currently executed", "standby", "executable", "currently stopped", and "zombie" are defined. The "types" and "states" of the application and service execution information 301 are updated by the application execution manager 201.

Figure 6:
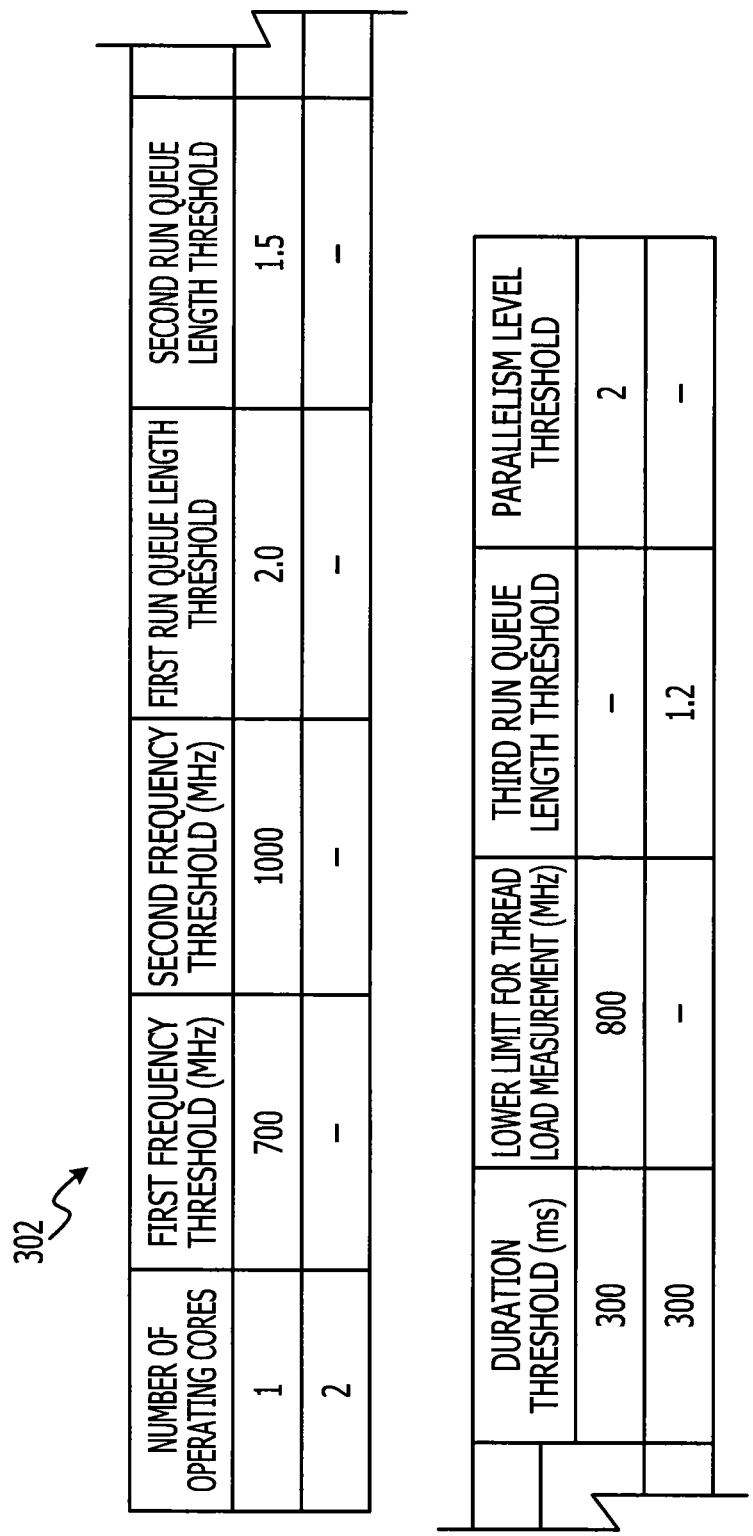
FIG. 6 is an outline diagram illustrating CPU core control parameter information according to the first embodiment.

FIG. 6 is an outline diagram illustrating the CPU core control parameter information 302 according to the first embodiment.

As illustrated in FIG. 6, the CPU core control parameter information 302 stores, as control parameters, a "first frequency threshold", a "second frequency threshold", a "first run queue length threshold", a "second run queue length threshold", a "duration threshold", a "lower limit for thread load measurement", a "third run queue length threshold", and a "parallelism level threshold".

The "first frequency threshold", the "second frequency threshold", the "first run queue length threshold", the "second run queue length threshold", the "duration threshold", the "lower limit for thread load measurement", and the "parallelism level threshold" are each used in order to determine whether or not the number of operating cores of the CPU 101 is increased or whether or not the core (core 1) 1012 of the CPU 101 is turned on. The "duration threshold" and the "third run queue length threshold" are each used in order to determine whether or not the number of operating cores of the CPU 101 is reduced or whether or not the core (core 1) 1012 of the CPU 101 is turned off.

The control parameters according to the first embodiment are not limited to the parameters stored in the CPU core control parameter information 302 and are set for each of configurations such as the minimum operational frequency of the CPU 101. The minimum operational frequency is the minimum value among multiple operational frequencies set to the CPU 101. The minimum value is set for each of the configurations of the CPU 101 or set by the OS.

Figure 7:
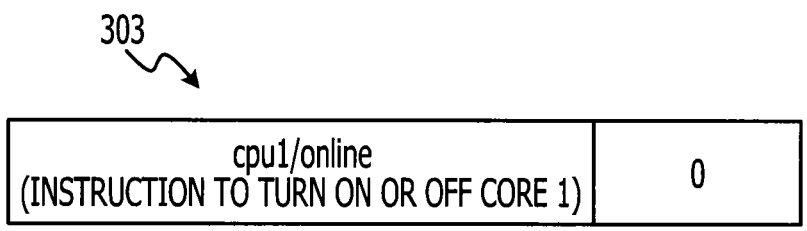
FIG. 7 is an outline diagram illustrating CPU control information according to the first embodiment.

FIG. 7 is an outline diagram illustrating the CPU control information 303 according to the first embodiment.

As illustrated in FIG. 7, the CPU control information 303 stores "0" or "1" as the "cpu1/online" that determines whether the core (core 1) 1012 of the CPU 101 is turned on or off. In the first embodiment, "0" is assigned to an instruction to turn off the core (core 1) 1012, and "1" is assigned to an instruction to turn on the core (core 1) 1012. Thus, if "0" is registered in the "cpu1/online" of the CPU control information 303, the CPU state controller 208 instructs the CPU frequency and state setting section 206 to turn off the core (core 1) 1012. If "1" is registered in the "cpu1/online" of the CPU control information 303, the CPU state controller 208 instructs the CPU frequency and state setting section 206 to turn on the core (core 1) 1012.

FIG. 8 is an outline diagram illustrating the process execution information 304 according to the first embodiment.

As illustrated in FIG. 8, the process execution information 304 is created for each of threads generated by the CPU 101 and stores a "thread ID (Sid)", an "execution state (State)", a "parent process ID (Ppid)", and an "accumulated execution time" for each of the threads. The "parent process ID (Ppid)" is the ID of a parent process of the interested thread. For example, when multiple threads are generated from the same application program, the same "parent process ID (Ppid)" is stored for each of the multiple threads.

The "accumulated execution time" is stored as an accumulated execution time of an application program such as an application or a service. The "accumulated execution time" starts to be counted when the application program is activated. The "thread IDs", "execution states", "parent process IDs", and "accumulated execution times" of the process execution information 304 are updated by the process and system manager 207 for each of monitoring operations.

FIG. 9 is an outline diagram illustrating the system state information 305 according to the first embodiment.

As illustrated in FIG. 9, the system state information 305 stores the "Online (the number of an online CPU core)", the "Offline (the number of an offline CPU core)", the "run-queue-avg", the "CPU utilization (%)", and the "operational frequency (MHz)". A number of an operating core of the CPU 101 is stored in the "Online". A number of a core that is not operating and is included in the CPU 101 is stored in the "Offline". When the core (core 0) 1011 and the core (core 1) 1012 are operating, "0" and "1" are stored in the "Online" and no value is stored in the "Offline". When only the core (core 0) 1011 is operating, "0" is stored in the "Online" and "1" is stored in the "Offline". The "run-queue-avg" indicates the latest average of the numbers of threads waiting to be executed by the CPU 101. The "CPU utilization" indicates the CPU utilization of the overall system or the total of execution times of all threads per unit time. The "operational frequency" indicates the operational frequency of the CPU 101. The "Online", "Offline", "run-queue-avg", "CPU utilization", and "operational frequency" of the system state information 305 are updated by the process and system manager 207 for each of the monitoring operations.

Figure 10:
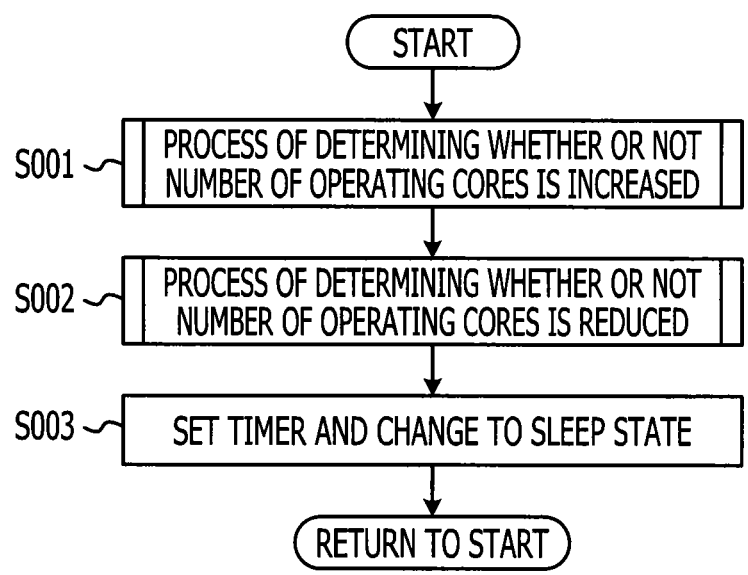
FIG. 10 is a flowchart of a process of determining control of a CPU core according to the first embodiment.

FIG. 10 is a flowchart of a process of determining control of the CPU core according to the first embodiment.

As illustrated in FIG. 10, the CPU core control determining section 202 executes a process of determining whether or not the number of operating cores of the CPU 101 is increased (in step S001). The process of determining whether or not the number of operating cores of the CPU 101 is described later in detail.

Next, the CPU core control determining section 202 executes a process of determining whether or not the number of operating cores of the CPU 101 is reduced (in step S002). The process of determining whether or not the number of operating cores of the CPU 101 is reduced is described later in detail.

Then, the CPU core control determining section 202 sets the timer 209 for the periodical monitoring and changes to a sleep state (in step S003). A time to be set in the timer 209 is not limited. The first embodiment assumes that the time to be set in the timer 209 is 10 milliseconds. After the set time elapses and the timer 209 expires, the CPU core control determining section 202 executes the process of determining control of the CPU core again from the process of step S001.

Figure 11:
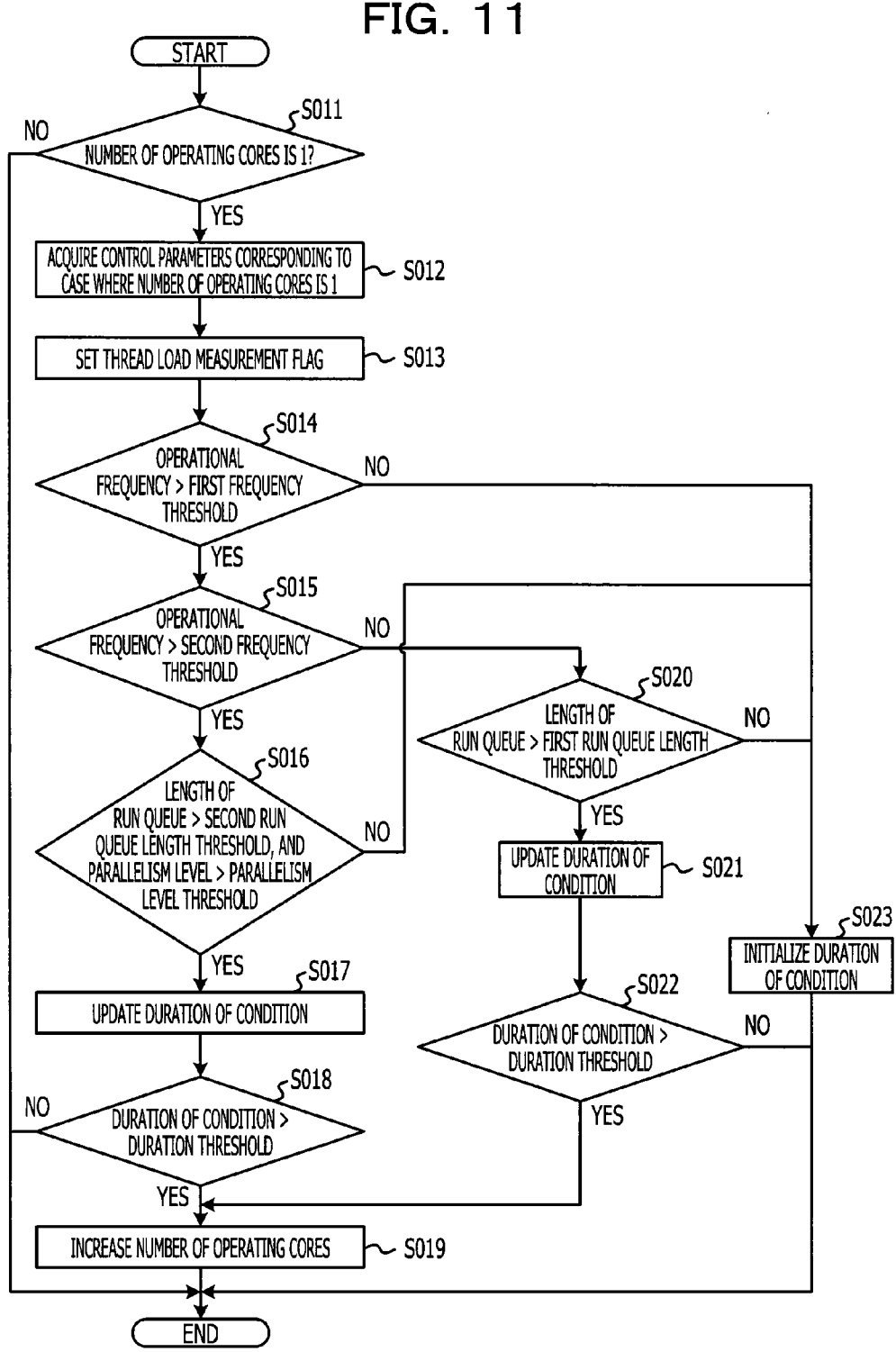
FIG. 11 is a flowchart of a process of determining whether or not the number of operating cores is increased according to the first embodiment.

FIG. 11 is a flowchart of the process of determining whether or not the number of operating cores is increased according to the first embodiment.

The process of determining whether or not the operation of the core (core 1) 1012 is started is described on the premise that only the core (core 0) 1011 of the CPU 101 is operating.

As illustrated in FIG. 11, the CPU core control determining section 202 references the system state information 305 and determines whether or not the number of operating cores of the CPU 101 is 1 (in step S011). Specifically, the CPU core control determining section 202 determines whether or not only "0" that is the number of the core "core 0" 1011 is registered in the "Online". When the CPU core control determining section 202 determines whether or not the number of operating cores of the CPU 101 is 1, the CPU core control determining section 202 starts measuring the duration of a condition on the basis of time information provided by the timer 209.

If the CPU core control determining section 202 determines that the number of operating cores is not 1 (No in step S011), the CPU core control determining section 202 terminates the process (according to the first embodiment) of determining whether or not the number of operating cores is increased.

If the CPU core control determining section 202 determines that the number of operating cores of the CPU 101 is 1 (Yes in step S011), the CPU core control determining section 202 references the CPU core control parameter information 302 and acquires control parameters corresponding to the case where the number of operating cores is 1 (in step S012). Specifically, the CPU core control determining section 202 acquires, as the control parameters, the "first frequency threshold", "second frequency threshold", "first run queue length threshold", "second run queue length threshold", "duration threshold", "lower limit for thread load measurement", and "parallelism level threshold" of the CPU core control parameter information 302.

Next, the CPU core control determining section 202 references the system state information 305 and sets a thread load measurement flag (in step S013). Specifically, if the operational frequency, stored in the system state information 305, of the CPU 101 is higher than the "lower limit for thread load measurement", the CPU core control determining section 202 stores "1" in the thread load measurement flag. If the operational frequency, stored in the system state information 305, of the CPU 101 is not higher than the "lower limit for thread load measurement", the CPU core control determining section 202 stores "0" in the thread load measurement flag. The thread load measurement flag is used in order to determine whether or not a parallelism level is calculated for each of threads. If "1" is stored in the thread load measurement flag, the thread load measurer 204 calculates CPU utilization for each of the threads. If "0" is stored in the thread load measurement flag, the thread load measurer 204 does not calculate CPU utilization for each of the threads.

Next, the CPU core control determining section 202 determines whether or not the operational frequency of the CPU 101 is higher than the "first frequency threshold" (in step S014). The first embodiment assumes that the "first frequency threshold" is "700 MHz".

If the CPU core control determining section 202 determines that the operational frequency of the CPU 101 is not higher than the "first frequency threshold" (No in step S014) or is equal to or lower than 700 MHz, the CPU core control determining section 202 initializes the duration of the condition on the basis of time information provided by the timer 209 (in step S023) or sets the duration of the condition to 0 (seconds) and terminates the process (according to the first embodiment) of determining whether or not the number of operating cores is increased.

In the first embodiment, if the CPU core control determining section 202 determines that the operational frequency of the CPU 101 is not higher than the "first frequency threshold" (700 MHz), the CPU core control determining section 202 determines that power to be consumed by the CPU 101 is not reduced by increasing the number of operating cores of the CPU 101 and the CPU core control determining section 202 does not increase the number of operating cores of the CPU 101 and terminates the process of determining whether or not the number of operating cores is increased.

If the CPU core control determining section 202 determines that the operational frequency of the CPU 101 is higher than the "first frequency threshold" (Yes in step S014) or 700 MHz, the CPU core control determining section 202 determines whether or not the operational frequency of the CPU 101 is higher than the "second frequency threshold" (in step S015). The first embodiment assumes that the "second frequency threshold" is "1000 MHz".

If the CPU core control determining section 202 determines that the operational frequency of the CPU 101 is higher than the "second frequency threshold" (Yes in step S015) or 1000 MHz, the CPU core control determining section 202 references the system state information 305 and determines whether or not the length of a run queue for threads is larger than the "second run queue length threshold" and whether or not the parallelism level of the threads is larger than the "parallelism level threshold" (in step S016). The first embodiment assumes that the "second run queue length threshold" is "1.5" and the "parallelism level threshold" is "2".

If the CPU core control determining section 202 determines that the length of the run queue for the threads is not larger than the "second run queue length threshold" and that the parallelism level of the threads is not larger than the "parallelism level threshold" (No in step S016), or the CPU core control determining section 202 determines that the length of the run queue for the threads is not larger than 1.5 and that the parallelism level of the threads is not larger than 2, the CPU core control determining section 202 initializes the duration of the condition on the basis of time information provided by the timer 209 (in step S023) or sets the duration of the condition to 0 (seconds) and terminates the process of determining whether or not the number of operating cores is increased.

If the CPU core control determining section 202 determines that the length of the run queue for the threads is larger than the "second run queue length threshold" and that the parallelism level of the threads is larger than the "parallelism level threshold" (Yes in step S016), or the CPU core control determining section 202 determines that the length of the run queue for the threads is larger than 1.5 and that the parallelism level of the threads is larger than 2, the CPU core control determining section 202 updates the duration of the condition on the basis of time information provided by the timer 209 (in step S017).

Next, the CPU core control determining section 202 determines whether or not the duration of the condition is larger than the "duration threshold" (in step S018). The first embodiment assumes that the "duration threshold" is "300 milliseconds".

If the CPU core control determining section 202 determines that the duration of the condition is not larger than the "duration threshold" (No in step S018) or is equal to or smaller than 300 milliseconds, the CPU core control determining section 202 terminates the process (according to the first embodiment) of determining whether or not the number of operating cores is increased.

If the CPU core control determining section 202 determines that the duration of the condition is larger than the "duration threshold" (Yes in step S018) or 300 milliseconds, the CPU core control determining section 202 operates the core (core 1) 1012 of the CPU 101 or increases the number of operating cores of the CPU 101 (in step S019) and terminates the process (according to the first embodiment) of determining whether or not the number of operating cores is increased. Specifically, the CPU core control determining section 202 updates the "cpu1/online" of the CPU control information 303 to "1". When the "cpu1/online" is updated to "1", the CPU state controller 208 instructs the CPU frequency and state setting section 206 to turn on the core (core 1) 1012, and as a result, both core (core 0) 1011 and core (core 1) 1012 operate.

If the CPU core control determining section 202 determines that the operational frequency of the CPU 101 is not higher than the "second frequency threshold" (No in step S015) or is higher than 700 MHz and not higher than 1000 MHz, the CPU core control determining section 202 determines whether or not the length of the run queue for the threads is larger than the "first run queue length threshold" (in step S020). The first embodiment assumes that the "first run queue length threshold" is "2.0".

If the CPU core control determining section 202 determines that the length of the run queue for the threads is not larger than the "first run queue length threshold" (No in step S020) or is equal to or smaller than "2.0", the CPU core control determining section 202 initializes the duration of the condition on the basis of time information provided by the timer 209 (in step S023) or sets the duration of the condition to 0 (seconds) and terminates the process (according to the first embodiment) of determining whether or not the number of operating cores is increased.

If the CPU core control determining section 202 determines that the length of the run queue for the threads is larger than the "first run queue length threshold" (Yes in step S020) or "2.0", the CPU core control determining section 202 updates the duration of the condition on the basis of time information provided by the timer 209 (in step S021).

In the first embodiment, if the operational frequency of the CPU 101 is in a range of the "first frequency threshold" to the "second frequency threshold" (or in a range of 700 MHz to 1000 MHz), the CPU core control determining section 202 determines that it is highly likely that power to be consumed by the CPU 101 is not reduced by increasing the number of operating cores of the CPU 101. Thus, the CPU core control determining section 202 uses the "first run queue length threshold" in order to determine whether to increase the number of operating cores of the CPU 101 and thereby provides an environment in which the number of operating cores of the CPU 101 is hardly increased. Note that the "first run queue length threshold" is larger than the "second run queue length threshold".

Next, the CPU core control determining section 202 determines whether or not the duration of the condition is larger than the "duration threshold" (in step S022). The first embodiment assumes that the "duration threshold" is "300 milliseconds". If the CPU core control determining section 202 determines that the duration of the condition is not larger than the "duration threshold" (No in step S022) or is equal to or smaller than 300 milliseconds, the CPU core control determining section 202 terminates the process (according to the first embodiment) of determining whether or not the number of operating cores is increased.

If the CPU core control determining section 202 determines that the duration of the condition is larger than the "duration threshold" (Yes in step S022) or 300 milliseconds, the CPU core control determining section 202 operates the core (core 1) 1012 or increases the number of operating cores of the CPU 101 (in step S019) and the terminates the process (according to the first embodiment) of determining whether or not the number of operating cores is increased. Specifically, the CPU core control determining section 202 updates the "cpu1/online" of the CPU control information 303 to "1".

In the first embodiment, if the operational frequency of the CPU 101 is equal to or lower than the "first frequency threshold" (700 MHz), the CPU core control determining section 202 determines that power to be consumed by the CPU 101 is not reduced by increasing the number of operating cores of the CPU 101, and the CPU core control determining section 202 does not increase the number of operating cores of the CPU 101. Thus, an unwanted increase in the number of operating cores may be suppressed. For example, an increase, caused by an increase in the number of operating cores, in power to be consumed by the CPU 101 may be suppressed.

In the first embodiment, however, if the operational frequency of the CPU 101 is in the range of the "first frequency threshold" to the "second frequency threshold (or in the range of 700 MHz to 1000 MHz), the CPU core control determining section 202 determines that it is highly likely that power to be consumed by the CPU 101 is not reduced by increasing the number of operating cores of the CPU 101. Thus, the CPU core control determining section 202 uses the "first run queue length threshold" in order to whether to increase the number of operating cores of the CPU 101 and thereby provides the environment in which the number of operating cores of the CPU 101 is hardly increased. Thus, an unwanted increase in the number of operating cores may be suppressed. For example, an increase, caused by an increase in the number of operating cores, in power to be consumed by the CPU 101 may be suppressed.

Figure 12:
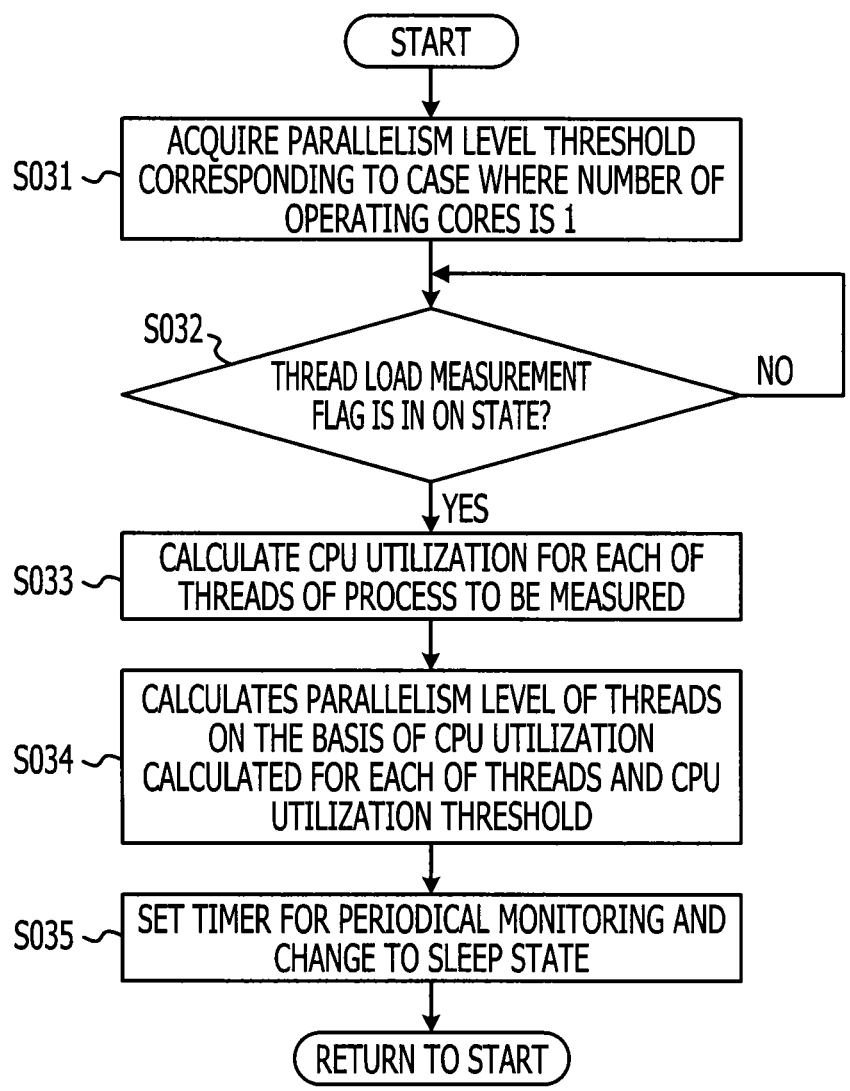
FIG. 12 is a flowchart of a process of measuring a thread load according to the first embodiment.

FIG. 12 is a flowchart of a process of measuring a thread load according to the first embodiment.

As illustrated in FIG. 12, the thread load measurer 204 references the CPU core control parameter information 302 and acquires the "parallelism level threshold" corresponding to the case where the number of operating cores of the CPU 101 is 1 (in step S031). The first embodiment assumes that the "parallelism level threshold" is "2".

Next, the thread load measurer 204 determines whether or not the thread load measurement flag is in an ON state or whether or not "1" is stored in the thread load measurement flag (in step S032).

If the thread load measurer 204 determines that the thread load measurement flag is not in the ON state (No in step S032) or that "1" is not stored in the thread load measurement flag, the thread load measurer 204 determines again whether or not the thread load measurement flag is in the ON state (in step S032).

If the thread load measurer 204 determines that the thread load measurement flag is in the ON state (Yes in step S032) or that "1" is stored in the thread load measurement flag, the thread load measurer 204 references the application and service execution information 301 and the process execution information 304 and calculates CPU utilization for each of threads of a process to be measured (in step S033). Specifically, the thread load measurer 204 first references the application and service execution information 301 and acquires a process ID of a foreground application. Subsequently, the thread load measurer 204 references the process execution information 304 and identifies the threads of which the parent process is the foreground application associated with the process ID. Then, the thread load measurer 204 calculates CPU utilization for each of the threads on the basis of accumulated execution times of the threads.

Next, the thread load measurer 204 calculates a parallelism level of threads executed by the CPU 101 on the basis of the CPU utilization calculated for the threads and a CPU utilization threshold (in step S034). Specifically, the thread load measurer 204 calculates the number of threads of which CPU utilization is higher than the CPU utilization threshold. The first embodiment assumes that the CPU utilization threshold is 40%.

Then, the thread load measurer 204 sets the timer 209 for the periodical monitoring and changes to a sleep state (in step S035). A time set in the timer 209 is not limited. The first embodiment, however, assumes that the time set in the timer 209 is several tens of milliseconds. After the set time elapses and the timer 209 expires, the thread load measurer 204 executes the process of measuring a thread load from the process of step S031.

In the first embodiment, when the operational frequency of the CPU 101 is equal to or lower than the "lower limit for thread load measurement", the CPU core control determining section 202 determines that power to be consumed by the CPU 101 is not reduced by increasing the number of operating cores of the CPU 101, and the thread load measurer 204 does not start the calculation of the parallelism level of the threads. Note that the "lower limit for thread load measurement" is equal to or lower than the "first frequency threshold". Thus, power to be consumed for the calculation of the parallelism level of the threads may be reduced.

Figure 13:
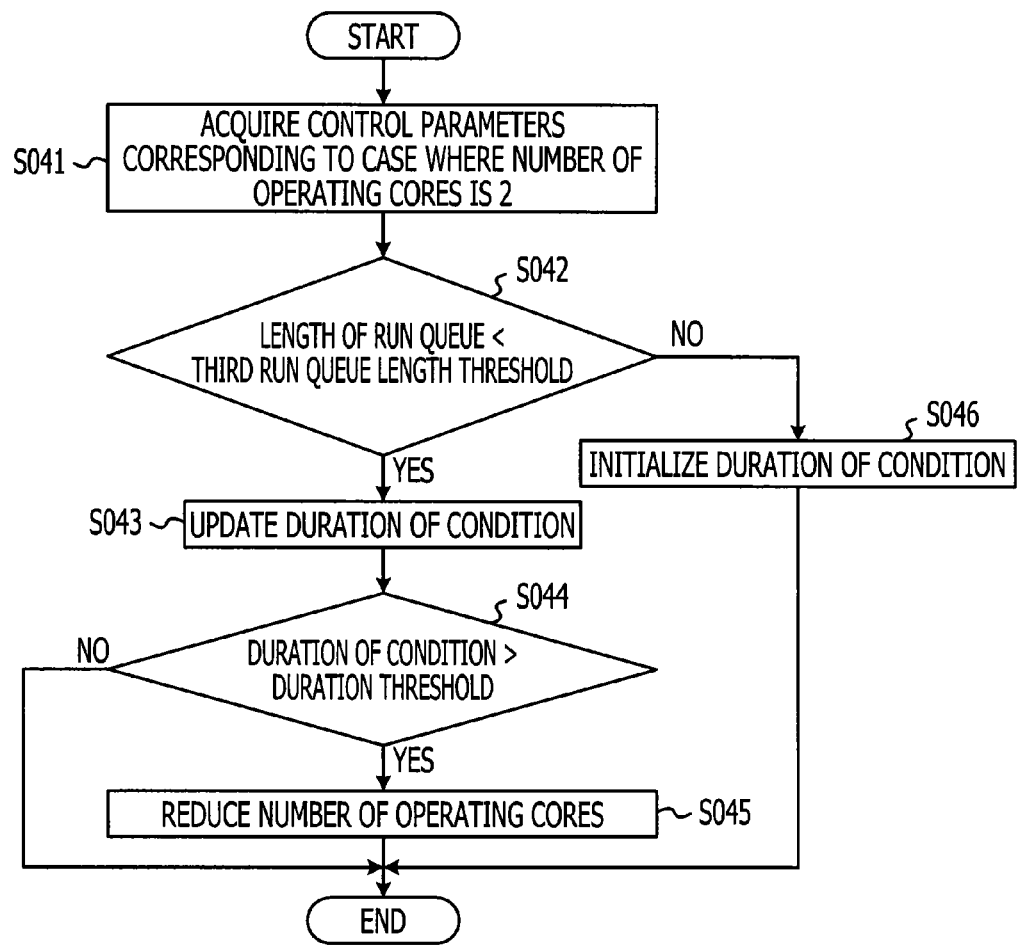
FIG. 13 is a flowchart of a process of determining whether or not the number of operating cores is reduced according to the first embodiment.

FIG. 13 is a flowchart of a process of determining whether or not the number of operating cores is reduced according to the first embodiment.

The process of determining whether or not the operation of the core (core 1) 1012 is stopped is described on the premise that both cores (cores 0 and 1) 1011 and 1012 of the CPU 101 are operating.

As illustrated in FIG. 13, the CPU core control determining section 202 references the CPU core control parameter information 302 and acquires control parameters corresponding to the case where the number of operating cores of the CPU 101 is 2 (in step S041). Specifically, the CPU core control determining section 202 acquires, as the control parameters, the "duration threshold" and "third run queue length threshold" of the CPU core control parameter information 302.

Next, the CPU core control determining section 202 references the system state information 305 and determines whether or not the length of the run queue for the threads is smaller than the "third run queue length threshold" (in step S042). The first embodiment assumes that the "third run queue length threshold" is "1.2".

If the CPU core control determining section 202 determines that the length of the run queue for the threads is not smaller than the "third run queue length threshold" (No in step S042) or is equal to or larger than 1.2, the CPU core control determining section 202 initializes the duration of the condition on the basis of time information provided by the timer 209 (in step S046) or sets the duration to 0 (seconds) and terminates the process (according to the first embodiment) of determining whether or not the number of operating cores is reduced.

If the CPU core control determining section 202 determines that the length of the run queue for the threads is smaller than the "third run queue length threshold" (Yes in step S042) or 1.2, the CPU core control determining section 202 updates the duration of the condition on the basis of time information provided by the timer 209 (in step S043).

Next, the CPU core control determining section 202 determines whether or not the duration of the condition is larger than the "duration threshold" (in step S044). The first embodiment assumes that the "duration threshold" is "300 milliseconds".

If the CPU core control determining section 202 determines that the duration of the condition is not larger than the "duration threshold" (No in step S044) or is equal to or smaller than 300 milliseconds, the CPU core control determining section 202 terminates the process (according to the first embodiment) of determining whether or not the number of operating cores is reduced.

If the CPU core control determining section 202 determines that the duration of the condition is larger than the "duration threshold" (Yes in step S044) or 300 milliseconds, the CPU core control determining section 202 stops the operation of the core (core 1) 1012 of the CPU 101 or reduces the number of operating cores of the CPU 101 (in step S045). Specifically, the CPU core control determining section 202 updates the "cpu1/online" of the CPU control information 303 to "0". When the "cpu1/online" is updated to "0", the CPU state controller 208 instructs the CPU frequency and state setting section 206 to turn off the core (core 1) 1012, and the operation of the core (core 1) 1012 is stopped.

Second Embodiment

A mobile information terminal 100A according to the second embodiment is described below with reference to FIGS. 14 to 17.

Figure 14:
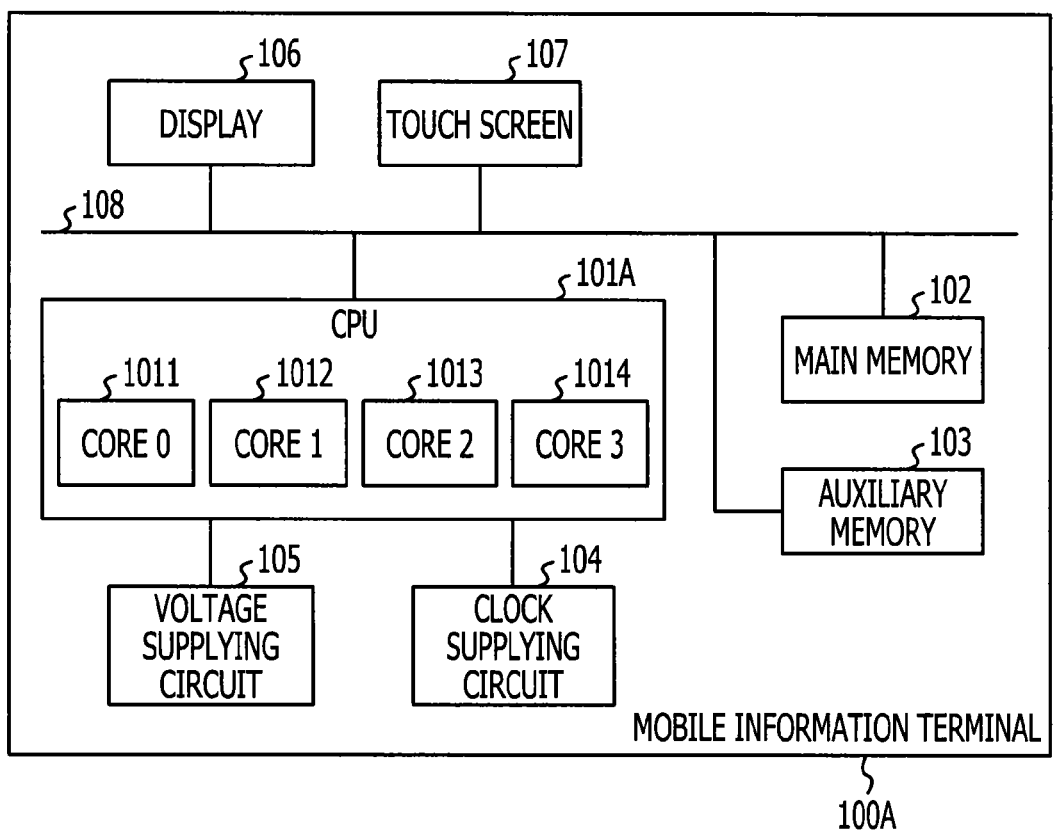
FIG. 14 is an outline diagram illustrating a hardware configuration of a mobile information terminal according to the second embodiment.

FIG. 14 is an outline diagram illustrating a hardware configuration of the mobile information terminal 100A according to the second embodiment.

The CPU 101 of the mobile information terminal 100 according to the first embodiment has the core (core 0) 1011 and the core (core 1) 1012, while a CPU 101A of the mobile information terminal 100A according to the second embodiment has the core (core 0) 1011, the core (core 1) 1012, a core (core 2) 1013, and a core (core 3) 1014.

Figure 15:
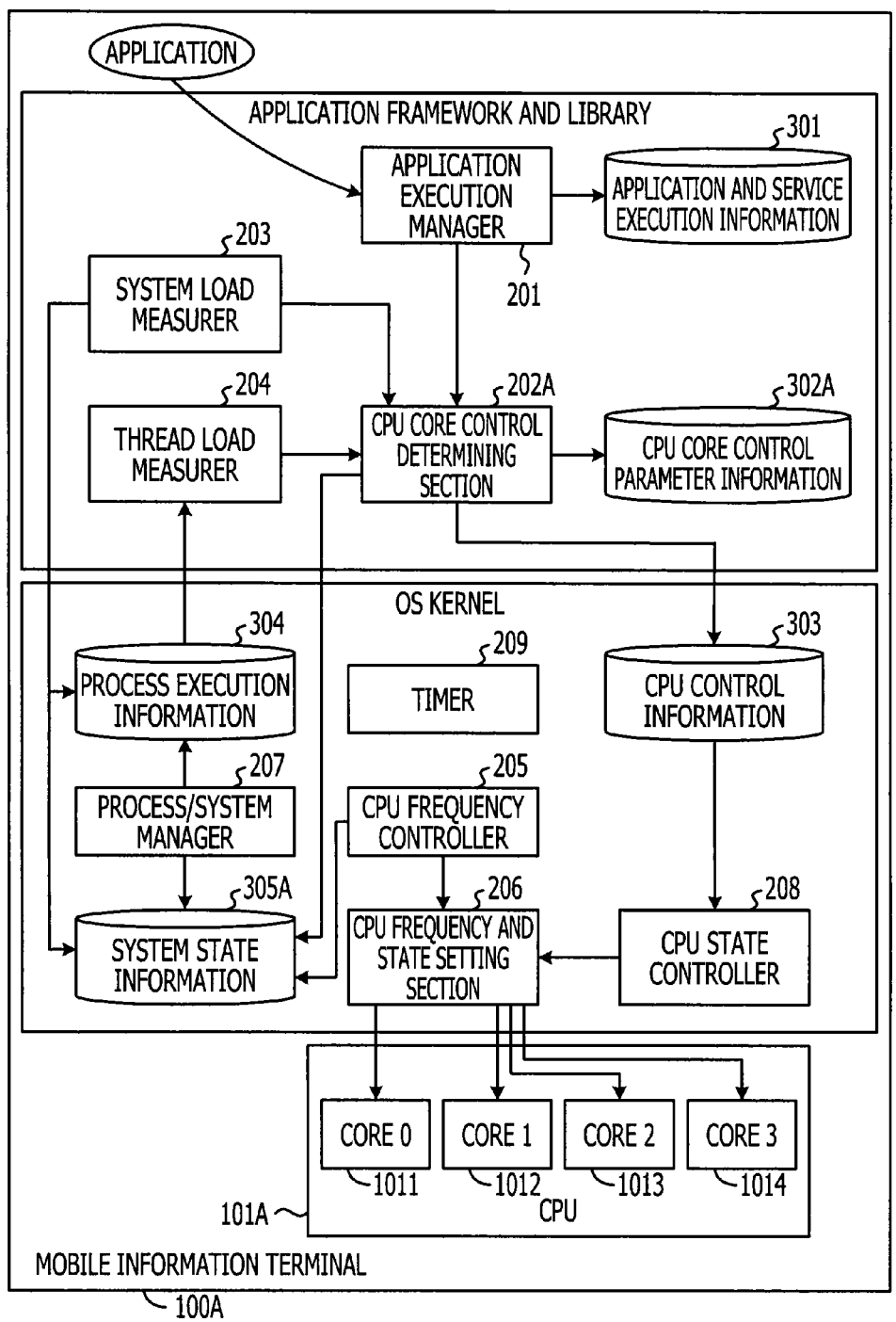
FIG. 15 is an outline diagram illustrating functional blocks of the mobile information terminal according to the second embodiment.

FIG. 15 is an outline diagram illustrating functional blocks of the mobile information terminal 100A according to the second embodiment.

In the second embodiment, the mobile information terminal 100A has a CPU core control determining section 202A, CPU core control parameter information 302A, and system state information 305A in order to achieve a process of determining control of the four cores of the CPU 101A.

The CPU core control determining section 202A, the CPU core control parameter information 302A, and the system state information 305A are each achieved by causing the CPU 101A to execute the OS kernel of ANDROID or the application framework and the library. The CPU core control parameter information 302A and the system state information 305A are built in the auxiliary memory 103.

FIG. 16 is an outline diagram illustrating the CPU core control parameter information 302A according to the second embodiment.

As illustrated in FIG. 16, the CPU core control parameter information 302A according to the second embodiment stores the control parameters of the CPU core control parameter information 302 according to the first embodiment, control parameters corresponding to the case where the number of operating cores of the CPU 101A is "3", and control parameters corresponding to the case where the number of operating cores of the CPU 101A is "4".

FIG. 17 is an outline diagram illustrating the system state information 305A according to the second embodiment.

As illustrated in FIG. 17, the system state information 305A according to the second embodiment stores "0", "1", "2", and "3" in the "Online" and "Offline", while "0" indicates the number of the core (core 0) 1011, "1" indicates the number of the core (core 1) 1012, "2" indicates the number of the core (core 2) 1013, and "3" indicates the number of the core (core 3) 1014.

The CPU core control determining section 202 according to the first embodiment determines whether or not the number of operating cores of the CPU 101 is 1 (in step S011). If the CPU core control determining section 202 determines that the number of operating cores of the CPU 101 is 1 (Yes in step S011), the CPU core control determining section 202 acquires the control parameters corresponding to the case where the number of operating cores is 1 (in step S012).

On the other hand, the CPU core control determining section 202A according to the second embodiment does not determine whether or not the number of operating cores of the CPU 101A is 1. The CPU core control determining section 202A references the system state information 305A and acquires the number of operating cores of the CPU 101A. Subsequently, the CPU core control determining section 202A according to the second embodiment references the CPU core control parameter information 302A and acquires control parameters associated with the acquired number of operating cores, instead of acquiring the control parameters corresponding to the case where the number of operating cores is 1.

Then, the CPU core control determining section 202A uses the control parameters associated with the acquired number of operating cores and thereby executes the process of determining whether or not the number of operating cores is increased and the process of determining whether or not the number of operating cores is reduced.

The technique disclosed herein, therefore, is not only applied to the dual-core CPU but also applied to another multi-core CPU such as a quad-core CPU.

The first and second embodiments assume that the mobile information terminals 100 and 100A are smart phones, tablet PCs, or the like. The mobile information terminals 100 and 100A, however, are not limited to those devices. The first and second embodiments are applicable to desktop PCs and server devices as long as the desktop PCs and the server devices each have a multi-core CPU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling an apparatus including a processor including a plurality of cores of which operational frequencies are variable within a frequency range, the method comprising:
    activating M cores of the plurality of cores operating at a first operational frequency within the frequency range, wherein M is one or more;
    identifying a first power consumed by the M activated cores;
    identifying a second power to be consumed by M+N activated cores operating at a second operational frequency which is minimum operational frequency of the frequency range;
    prohibiting an increase of the number of the cores to be activated from M to M+N when the first power is less than the second power; and
    increasing a number of the cores to be activated from M to M+N, and decreasing the operational frequency when the first power is greater than the second power.

2. The method according to claim 1, further comprising:
    comparing the first operational frequency of the M activated cores to a first frequency threshold.

3. The method according to claim 2, further comprising:
    increasing the number of activated cores when a duration of a run length queue exceeds a run length queue threshold for a predetermined time when the first operational frequency of M activated core is less than a second frequency threshold.

4. The method according to claim 1, further comprising:
comparing a duration of run length demand to a run length threshold.

5. The method according to claim 1, further comprising:
comparing a core parallelism to a parallelism level.

6. The method according to claim 5, further comprising:
calculating an index related to the number of threads executed in the M activated cores when the first power is greater than the second power; and
determining whether to increase in the number of the cores to be activated from M to M+N based on the index.

7. The method according to claim 6, wherein the comparing includes:
acquiring a load of the thread on the M activated cores; and
setting the index to the number of the threads that cause the load on the processor to be equal to or greater than a threshold.

8. The method according to claim 6, further comprising:
prohibiting increasing of the number of cores to be activated from M to M+N when the number of the threads that cause the load on the M activated cores to be equal to or greater than the threshold is equal to or less than M.

9. The method according to claim 1, further comprising:
reducing the number of activated cores to less than M when a length of a run length queue is less than a run length queue threshold for at least a predetermined time.

10. The method according to claim 1, wherein
the apparatus executes an operating system kernel of a mobile information terminal.

11. An apparatus comprising:
a memory; and
processing circuitry including a plurality of cores of which operational frequencies are variable within a frequency range and coupled to the memory and configured to:
activate M cores of the plurality of cores operating at a first operational frequency within the frequency range, wherein M is one or more;
identify a first power consumed by the M activated cores;
identify a second power to be consumed by M+N activated cores operating at a second operational frequency which is minimum operational frequency of the frequency range;
prohibit an increase of the number of the cores to be activated from M to M+N when the first power is less than the second power; and
increase a number of the cores to be activated from M to M+N, and decreasing the operational frequency when the first power is greater than the second power.

12. The apparatus according to claim 11, wherein
the processing circuitry is configured to compare the first operational frequency of the M activated cores to a first frequency threshold.

13. The apparatus according to claim 11, wherein the processing circuitry is configured to:
calculate an index related to the number of threads executed in the M activated cores when the first power is greater than the second power, and
determine whether or not to increase the number of the cores to be activated from M to M+N based on the index.

14. A non-transitory computer-readable storage medium storing a program for causing a computer including a plurality of cores of which operational frequencies are variable within a frequency range to execute a method, the method comprising:
activating M cores of the plurality of cores operating at a first operational frequency within the frequency range, wherein M is one or more;
identifying a first power consumed by the M activated cores;
identifying a second power to be consumed by M+N activated cores operating at a second operational frequency which is minimum operational frequency of the frequency range;
prohibiting an increase of the number of the cores to be activated from M to M+N when the first power is less than the second power; and
increasing a number of the cores to be activated from M to M+N, and decreasing the operational frequency when the first power is greater than the second power.

* * * * *